(12) United States Patent  
Yagnik

(10) Patent No.: US 8,229,959 B1  
(45) Date of Patent: Jul. 24, 2012

(54) SHARABLE SEARCH RESULT LABELS

(75) Inventor: Niyati Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 321 days.

(21) Appl. No.: 12/616,721

(22) Filed: Nov. 11, 2009

(51) Int. Cl.  
*G06F 7/00* (2006.01)  
*G06F 17/30* (2006.01)

(52) U.S. Cl. .................................... 707/782; 707/783

(58) Field of Classification Search .................. None  
See application file for complete search history.

(56) References Cited

U.S. PATENT DOCUMENTS

| | | | |
|---|---|---|---|
| 7,231,393 B1 | 6/2007 | Harik et al. | |
| 7,383,258 B2 | 6/2008 | Harik et al. | |
| 2004/0249801 A1* | 12/2004 | Kapur | 707/3 |
| 2010/0145927 A1* | 6/2010 | Kasbekar et al. | 707/710 |
| 2011/0010092 A1* | 1/2011 | Kavranoglu | 701/209 |

* cited by examiner

*Primary Examiner* — Uyen T. Le  
(74) *Attorney, Agent, or Firm* — Fish & Richardson P.C.

(57) ABSTRACT

Methods, systems, and apparatus, including computer programs encoded on a computer storage medium, for search labels. In one aspect, a method includes receiving an association by a first user of a first label to a first search result in a plurality of first search results that were provided to the first user in response to a query submitted by the first user, and wherein a second user is unable to view the association. Permission is granted on behalf of the first user to allow the second user to share the first label. And, subsequent to granting permission, an association of the first label by the second user to a third search result in a plurality of third search results that were provided to the second user in response to a query submitted by the second user is received.

24 Claims, 8 Drawing Sheets

SHARABLE SEARCH RESULT LABELS

BACKGROUND

A web search engine searches for information on the World Wide Web in response to queries submitted by users. Search results can be presented in a list ordered by relevance and can include web pages, images, videos, information and other types of content deemed to be responsive to queries. Some search engines also mine data available in databases or other types of data repositories. A web crawler is a tool that systematically visits web sites in order to index their contents. Search engines use indexes built by web crawlers in order to find documents that are relevant to queries. When a user enters a query into a search engine, the engine examines its index and provides a listing of best-matching documents, usually with a short snippet containing the document's title and a portion of the document's text.

SUMMARY

In general, one aspect of the subject matter described in this specification can be embodied in a method that includes creating a first label on behalf of a first user and a second label on behalf of a second user; receiving an association by the first user of the first label to a first search result in a plurality of first search results that were presented to the first user in response to a query submitted by the first user, and wherein the second user is unable to view the association; receiving an association by the second user of the second label to a second search result in a plurality of second search results that were presented to the second user in response to a query submitted by the second user, and wherein the first user is unable to view the association; granting permission on behalf of the first user to allow the second user to share the second label; and subsequent to granting permission, receiving an association of the first label by the second user to a third search result in a plurality of third search results that were presented to the second user in response to a query submitted by the second user. Other embodiments of this aspect include corresponding systems, apparatus, and computer program products.

These and other embodiments can optionally include one or more of the following features. A search result can be a web page, an image, a video, a news article or an advertisement. The first label and the second label can be identical. Concepts can be derived by analyzing content of search results associated with the first label. Ad categories can be associated with the first user based on the derived concepts. Advertising can be targeted to the first user based on the derived concepts. Search results associated with the first label can be published. Receiving an association by the first user of the first label to the first search result can include storing a portion of the first search result as part of the association.

Particular embodiments of the subject matter described in this specification can be implemented so as to realize one or more of the following advantages. Users can label search results and other content for easy retrieval. Labels can be used to cooperatively label content by sharing the label with others. Labeled content can be mined for concepts in order to target advertisements to users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
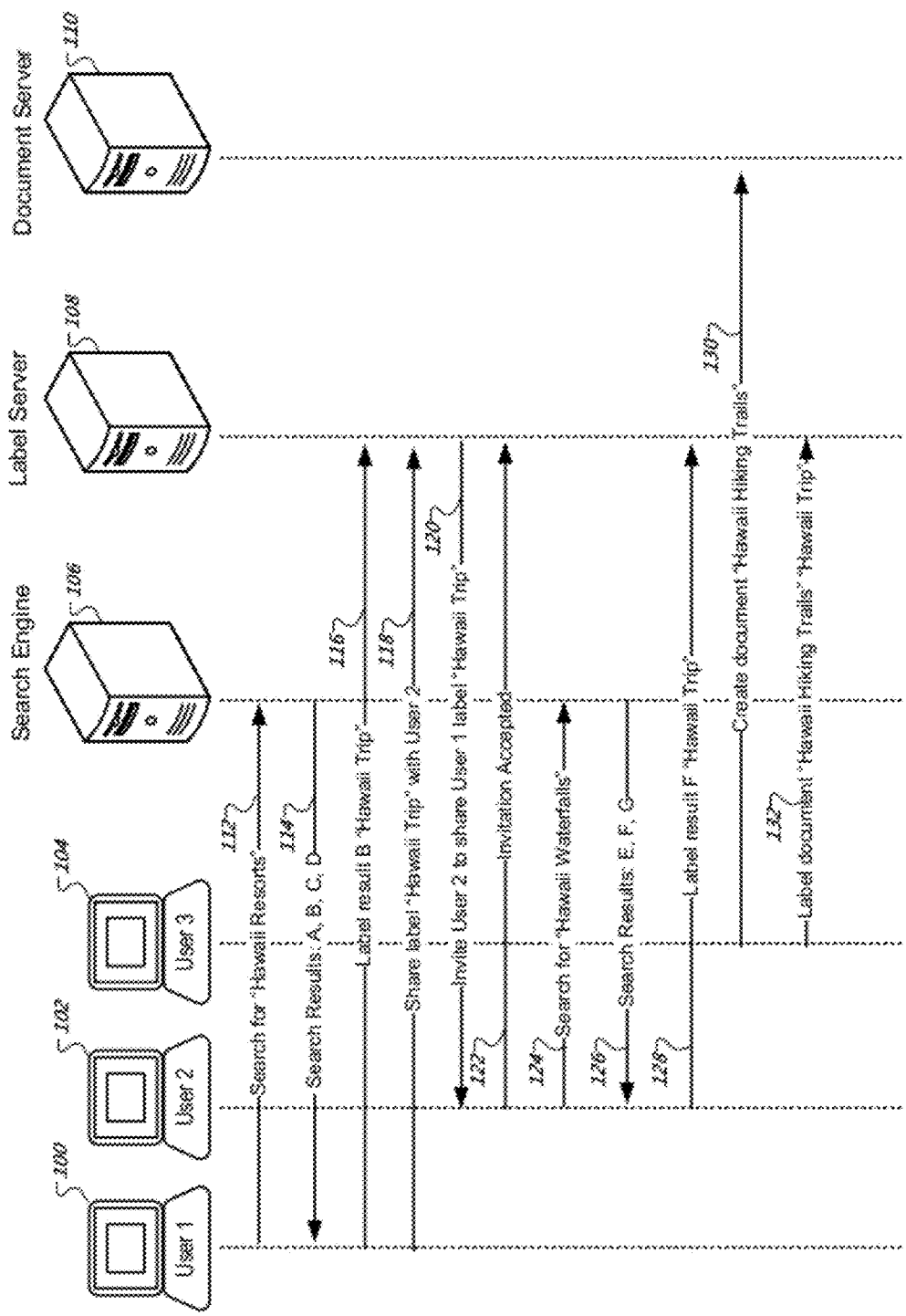
FIG. 1A illustrates an example of label use.

FIG. 1A illustrates an example of label use. A label is a text string that includes one or more characters or symbols. In some implementations, a label is an image or a combination of an image and a text string. Users can create labels and use them to label content such as web search results (e.g., web pages, images, videos, news articles, products), documents (e.g., word processing and spreadsheet documents), electronic mail (email) messages, and advertisements ("ads"), for example. Other types of content which can be labeled are possible. Labeled content can be retrieved by the user who created the label. Users can also share their labels with others so that groups of users can collaboratively view and label content. In further implementations, labels can be organized in hierarchies.

Client devices 100, 102, and 104, such as personal computers, mobile phones, tablet computers, or other devices or data processing apparatuses, are capable of interacting with server devices (search engine 106, label server 108 and document server 110), by transmitting and receiving data through one or more computer networks such as, for example, the Internet. While the server devices are illustrated as single devices in FIG. 1A, server devices can themselves comprise networks of devices or processes that cooperate to handle requests from, and provide responses to, the client devices. The client devices and the server devices can reside on the same network or on different networks. In further implementations, the functionality of some or all of the server devices can be combined into a single server device.

By way of illustration, User 1 interacting with client device 100 through a software application such as a web browser or other application, submits a query 112 to a search engine 106. The query can comprise text, one or more images, or sounds (e.g., spoken words or phrases), for example. The search engine 106 uses one or more indexes of content on the world wide web, or indexes of other content, to identify results responsive to the query. The search engine 106 transmits search results 114 to the client device 100, and the software application executing on the client device 100 presents the results to User 1. The search results can consist of, for instance, references or links to content that satisfy the query, the actual content itself, or combinations thereof.

Figure 2A:
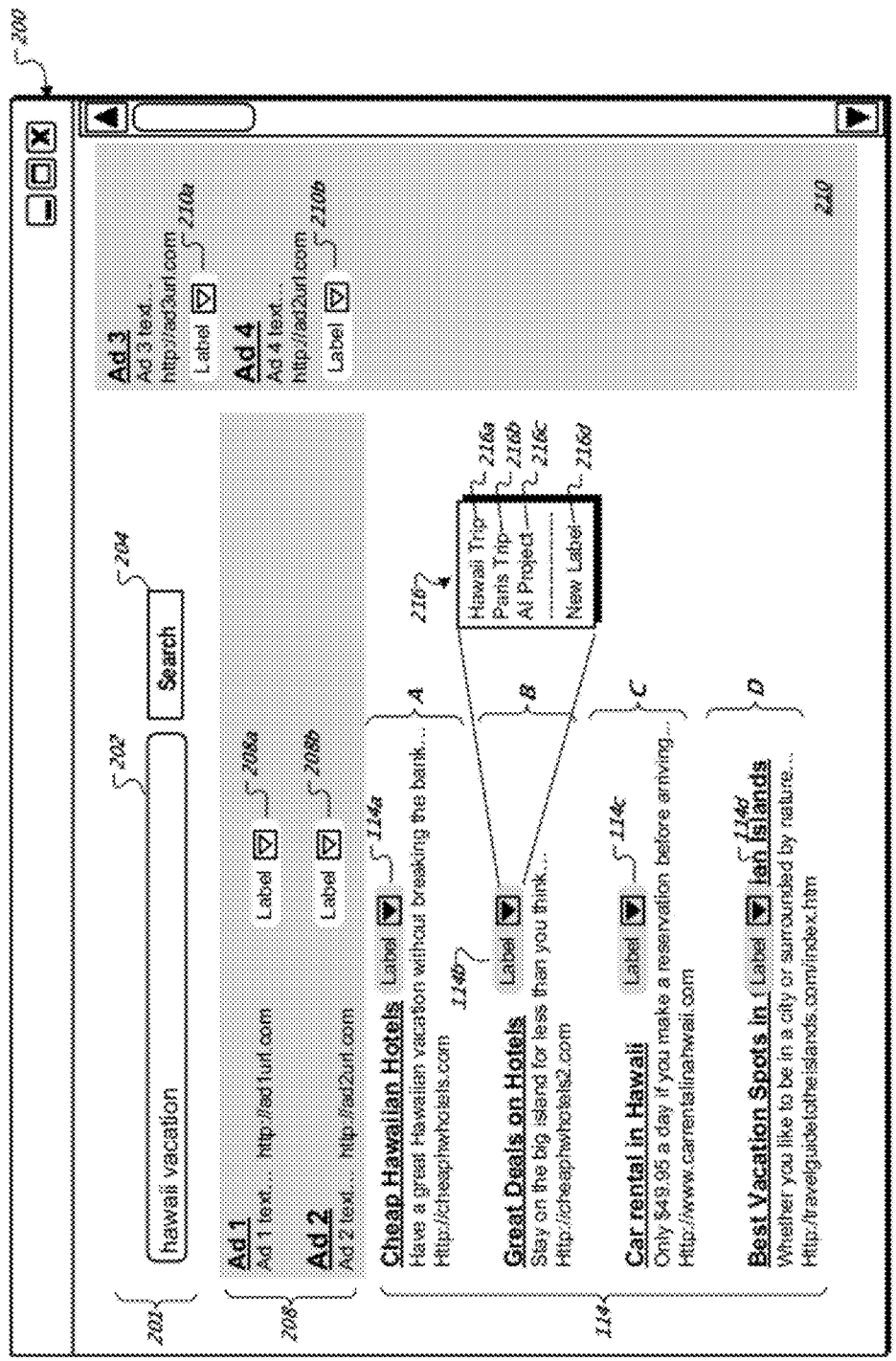
FIG. 2A illustrates an example graphical user interface for presenting query search results.

FIG. 2A illustrates an example graphical user interface 200 for presenting query search results A, B, C and D. The user interface 200 includes four general areas: a query area 201 where users can submit their queries by entering text 202 and selecting a search button 204 with a mouse, or other input device; a search results area for presenting search results responsive to the query, a primary ads area 208 for presenting ads, and a secondary ads area 210 for presenting additional ads. Other configurations of the user interface 200 are possible. In some implementations, one or more of the search results and/or the ads include an interactive display element (208*a-b*, 210*a-b*, 114*a-d*) of the user interface 200 for optionally assigning a label to the respective search result or ad. In other implementations, a label can be assigned to a search result or an ad without the use of a display element. For example, a keyboard command, a finger gesture, a voice command, or other type of input can be used instead. Other user interfaces are possible, however.

Figure 1B:
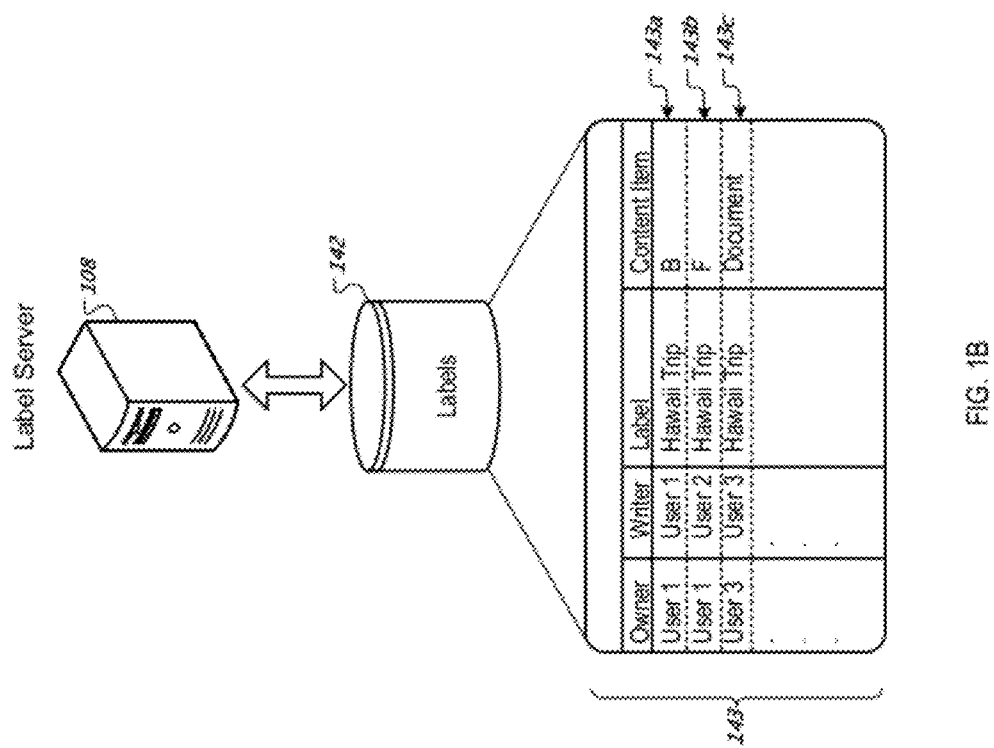
FIG. 1B illustrates a label repository.

By way of illustration, user selection of display element 114*b* causes a pop-up menu 216 to appear in the user interface 200. The menu 216 allows the user to select a preexisting label to assign to the search result B or create a new label for the search result B. Menu 216 includes label 216*a* "Hawaii Trip", label 216*b* "Paris Trip", label 216*c* "AI Project", and a special menu item 216*d* which allows the user to create new labels. The menu 216 grows as new labels are added to it. In response to selection of menu item 216*a* by User 1, client device 100 sends a message 116 to the label server 108 requesting association of search result B with the label "Hawaii Trip". The label server 108 maintains a label repository 142 (see FIG. 1B) which stores label associations 143 for different users. For instance, label association 143*a* identifies for the label "Hawaii Trip" that the label's owner is User 1, the label's writer is User 1, and the labeled item is the search result B (see FIG. 2A). A snippet or portion of the search result (e.g., text, images or combinations thereof from the search result) can also be saved in the label association 143*a*. In some implementations, a label's owner is the user that created the label. The label's writer identifies the user who assigned the label to the labeled item. In this case, the owner and the writer are the same user. However, they need not be as in the case of a shared label. Label sharing is described further below.

Figure 2B:
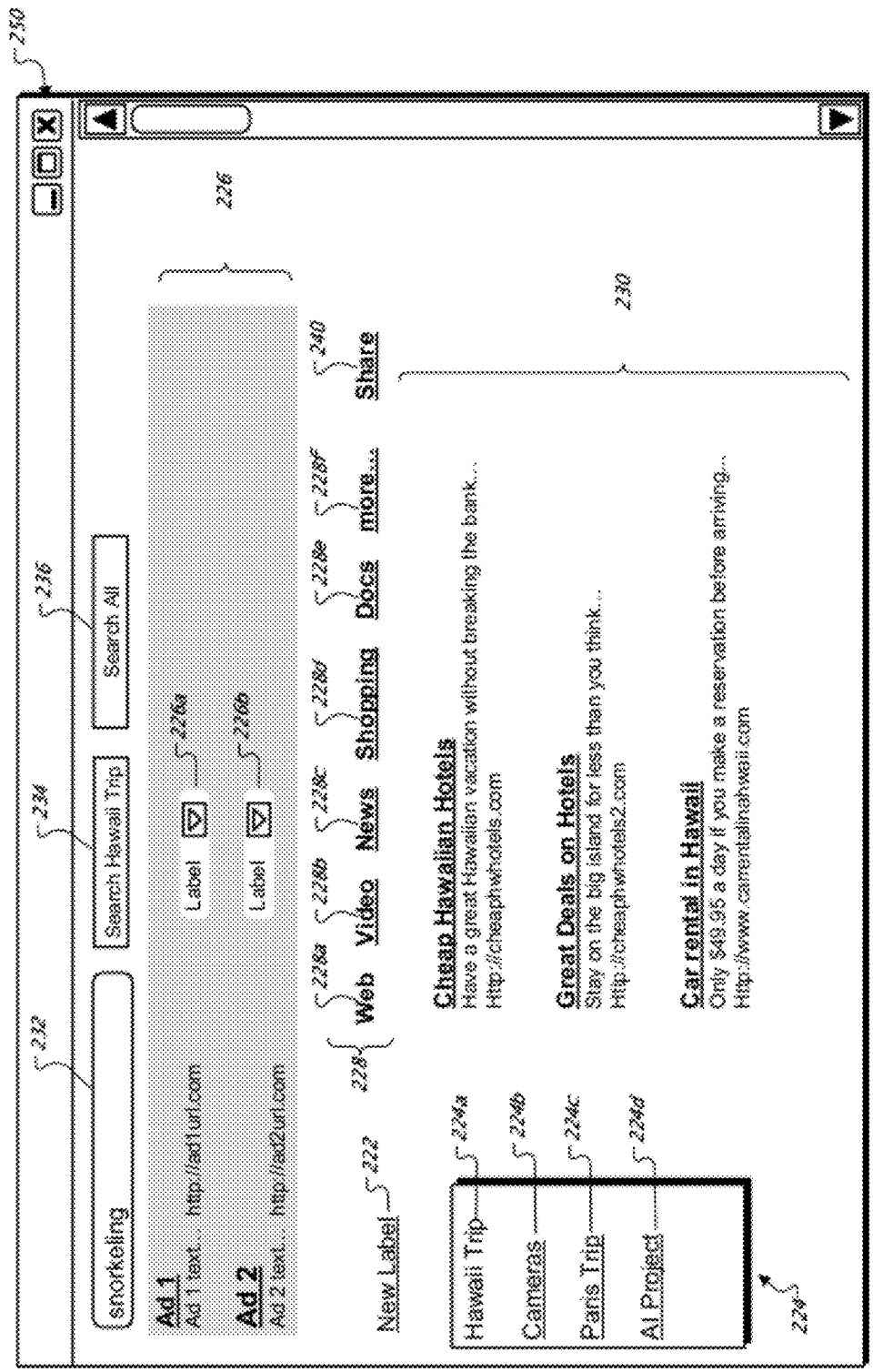
FIG. 2B illustrates an example graphical user interface for managing a user's labels.

FIG. 2B illustrates an example graphical user interface 250 for managing a user's labels. One region of the interface presents a list of interactive display elements representing some or all of the user's existing labels 224. An interactive display element 222 can be selected to create a new label. Selection of an existing label, such as label 224*a* for "Hawaii Trip", will cause contents associated with that label, or references/links thereto, to be displayed in region 230 according to a content category 228*a-f* display element selected in region 228. The content categories in this illustration include web search results 228*a*, video search results 228*b*, news articles 228*c*, product search results 228*d*, documents 228*e*. Other categories are possible, however. The display element 228*f* allows the user to select other categories that are not displayed in region 228. By way of illustration, to display all web search results labeled with "Hawaii Trip", the user can select category 228*a* "Web". Likewise, to display all shopping items labeled with "Hawaii Trip", the user can select category 228*d*.

Content for a specific label or for all of a user's labels can be searched. In some implementations, a text field display element 232 where users can enter queries and submit them by selecting a button display element 234 to search content of the currently selected label (e.g., 224*a*), or by selecting a button display element 236 to search the content of all of the user's labels.

One or more regions (e.g., 226) of the user interface 250, or other user interface, can be reserved for ads. Ads can be selected automatically based on the relevance of the ad to the labeled content for a given category (e.g., video 228*b*), to the labeled content for all categories for the currently selected label, or to all content associated with some or all of the user's labels. Ads can also be selected automatically based on keywords, for example. Ads that are presented in region 226 can themselves be labeled by selection of display elements 226*a* or 226*b*. In further implementations, users can also publish their label content to a publicly accessible web page or social networking sites such as Orkut, facebook, and so on, to let a broader audience know about their labeled content. Ads can also be selected for these publications based on relevance to the label content or keywords, for instance. Ads are described further below with reference to FIG. 3.

Figure 2C:
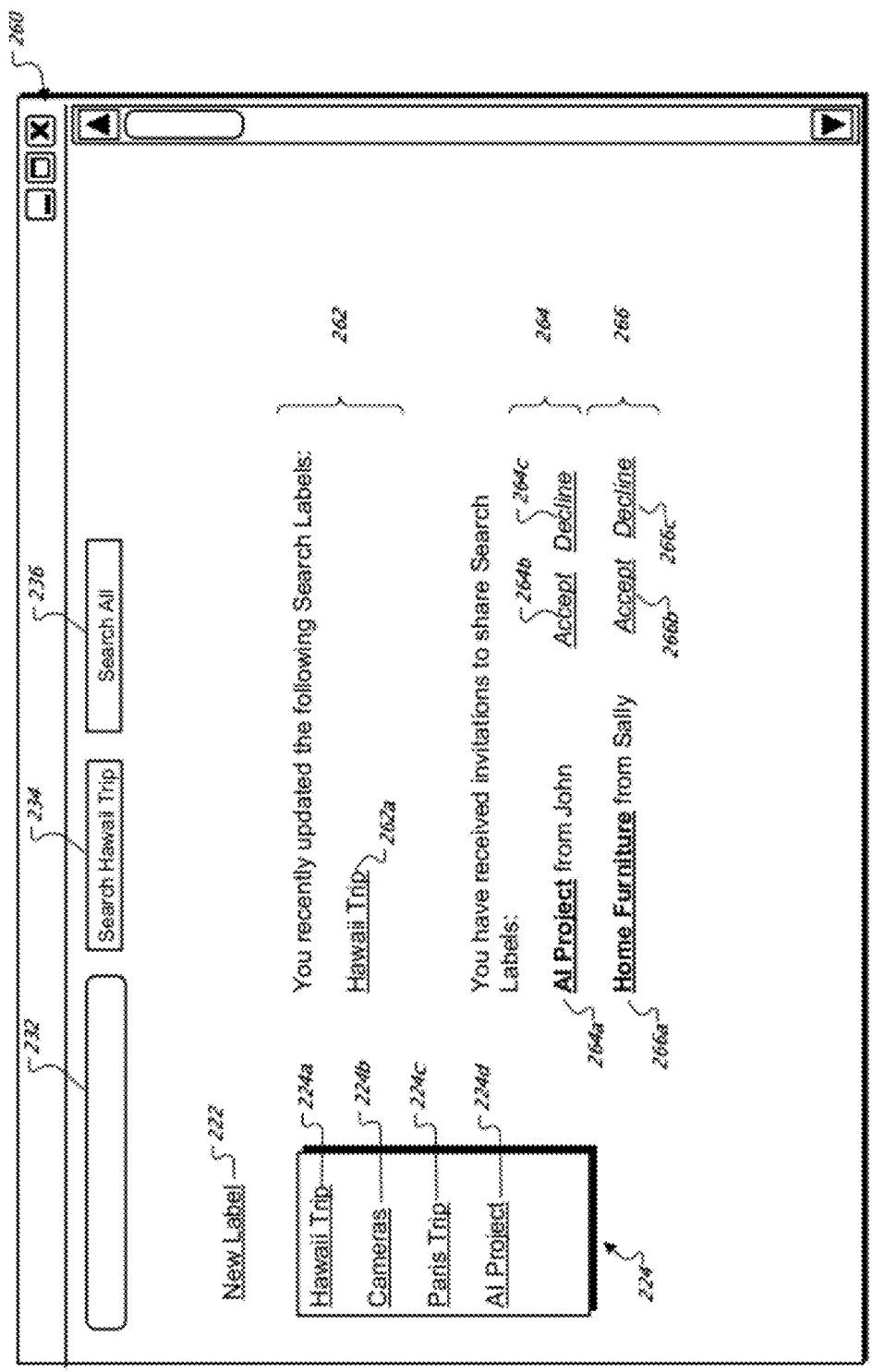
FIG. 2C illustrates an example graphical user interface for accepting invitations to share labels.

Users can invite others to share their labels by selecting a graphical display element 240, for example. For example, an email message containing the invitation in the form of a hyperlink that, when selected, causes a web page to be presented that allows the invitee to accept or decline the invitation. Alternatively, graphical user interface 260 shown in FIG. 2C can be presented to the invitee when they log into their account or at another point in time. Other ways of communicating label sharing invitations are possible. By way of illustration, the user interface 260 includes a summary of recently used labels 262 and invitations to share labels 264, 266. In this example the invitations are to share label 264*a* "AI Project" with John, and to share the label 266*a* "Home Furniture" with Sally. Users can accept or decline such invitations by selecting the corresponding accept (264*b*, 266*b*) or decline (264*c*, 266*c*) display elements. In some implementations, an invitation to share a label can give the invitee permission to view the label's associated content, permission to use the label to label content, or both. A user can also revoke label permissions they have granted to others.

Returning to FIG. 1A, User 1 next invites User 2 to share label "Hawaii Trip", such as by selecting the display element 240 of user interface 250 in FIG. 2B. In response, User 1's client device 100 sends a sharing request 118 to label server 108. The label server 108 then sends an invitation 120 to user to User 2's client device 102. User 2 then accepts the invitation as indicated by message 122 to the label server 108, and begins labeling content. By way of illustration, User 2 then performs a search for "Hawaiian Waterfalls" as indicated by query 124 sent from the client device 102 to the search engine 106. In response, the search engine 106 returns search results E, F and G in message 126. User 2 then labels search result F with the label "Hawaii Trip" as indicated by message 128. The label server 108 adds an entry 143*b* to the label associations 143 in the repository 142 to indicate that label "Hawaii Trip" owned by User 1 was associated with search result F by User 2. User 2 is the label "writer" in this case since User 2 created the association 143*b*.

Continuing with example of FIG. 1A, user 3 using a word processor application executing on the client device 104 creates a new document entitled "Hawaii Hiking Trails" by causing the word processor application to send the content of the document 130 to the document server 110 for storage. User 3 then labels the document "Hawaii Trip". In response, the word processor causes the client device 104 to send a label request 132 to the label server 108. In response, the label server 108 creates a new association 143*c* which indicates that the label "Hawaii Trip," which is owned by user 3, is associated with the document by user 3, the label "writer" in this case. Note that there are two "Hawaii Trip" labels: one owned by User 1, and the other owned by User 2. In various implementations, users can have identical labels but will not be able to see each others' labels unless the labels are shared.

Figure 3:
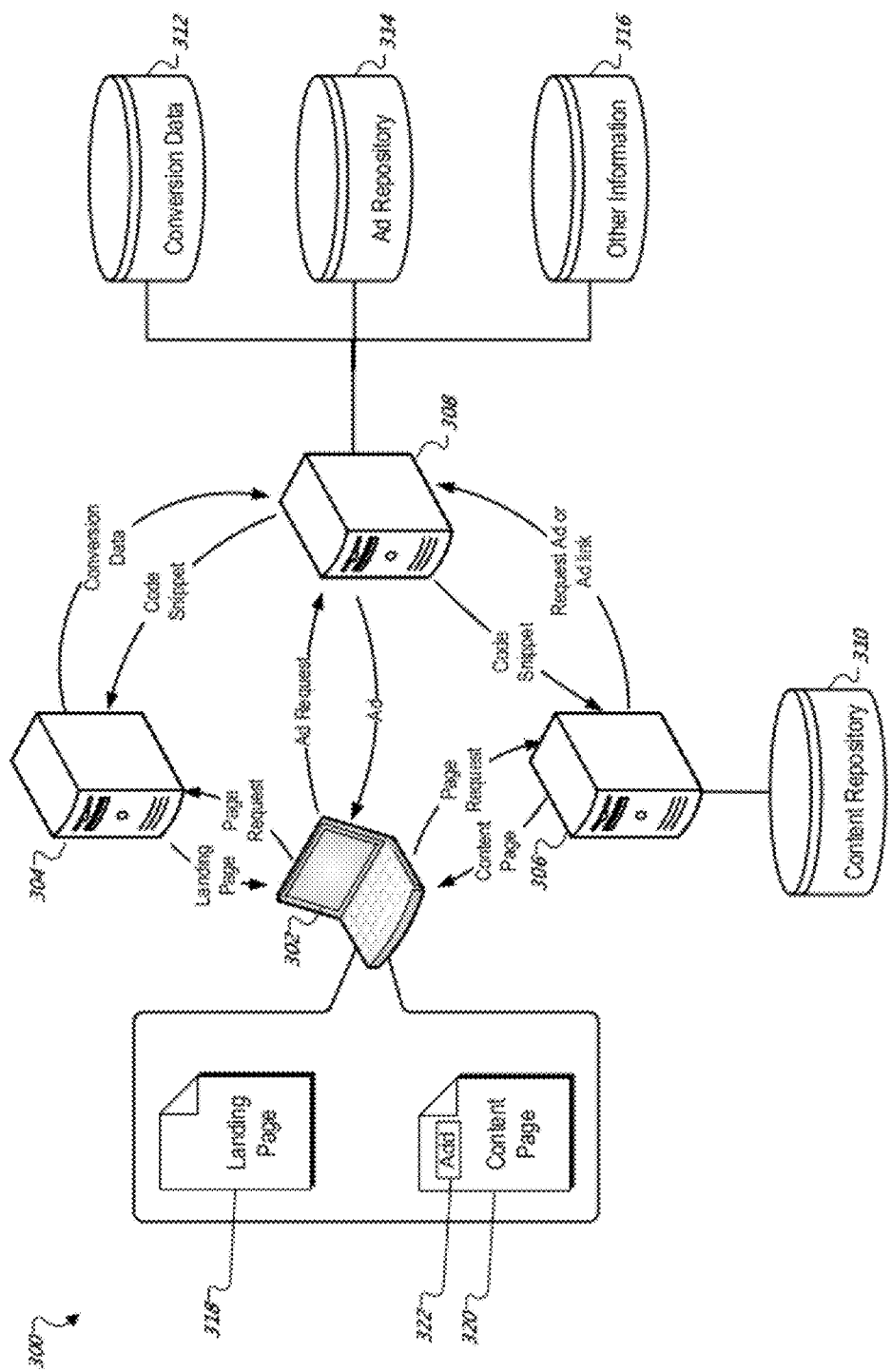
FIG. 3 is a block diagram of an example online advertising system.

FIG. 3 is a block diagram of an example online advertising system 300. In some implementations, one or more advertisers 304 can directly, or indirectly, enter, maintain, and track ad information in an ad management system 308. The ads (e.g., ads in region 226 of user interface 250 in FIG. 2B) can be stored in a repository 314 coupled to the system 308. The ads may be in the form of graphical ads, such as banner ads, text only ads, image ads, audio ads, video ads, ads combining one of more of any of such components, etc. The ads may also include embedded information, such as embedded media, links, meta-information, and/or machine executable instructions. One or more publishers 306 may submit requests for ads or ad link units to the system 308. (Link units display a list of topics that are relevant to the content of a page. When a user clicks a topic, a page of ads related to the topic are shown.) The system 308 responds by sending ads, ad link units, or information that will allow for the retrieval of ads or ad link units to the requesting publisher 306 for placement/serving on one or more of the publisher's web properties (e.g., websites and other network-distributed content such as the labels user interface 250 in FIG. 2B). The ads or ad link units can be placed with or embedded in the publisher's content (e.g., videos, articles, search results), which can be stored in a repository 310 at the publisher 306, and/or placed with content received from other sources (e.g., other publishers, advertisers).

Other entities, such as users 302 and advertisers 304, can provide usage information to the system 308, such as, for example, whether or not a conversion or click-through related to an ad has occurred. In some implementations, conversion data can be stored in a repository 312, where it can be used by the system 308 to improve ad targeting performance. The usage information provided to the system 308 can include measured or observed user behavior related to ads that have been served. In some implementations, the system 308 performs financial transactions, such as crediting the publishers 306 and charging the advertisers 304 based on the usage information.

A computer network, such as a local area network (LAN), wide area network (WAN), the Internet, wireless network or a combination thereof, can connect the advertisers 304, the system 308, the publishers 306, and the users 302.

One example of a publisher 306 is a general content server that receives requests for content (e.g., articles, electronic mail messages, discussion threads, music, video, graphics, networked games, search results, labels and associated label content, web page listings, information feeds, dynamic web page content, etc.), and retrieves the requested content in response to the request. The content server may submit a request (either directly or indirectly) for ads or ad link units to an ad server in the system 308. The ad request may include the number of ads desired. The ad link unit request may include the number of ad link units desired and the number of ad links per ad link unit. The ad or ad link unit request may also include content request information. This information can include the content itself (e.g., page or other content document), a category or keyword corresponding to the content or the content request (e.g., arts, business, computers, arts-movies, arts-music, etc.), the structure of the publisher's content (e.g., news articles, videos, images, products, and so on), part or all of the content request, content age, content type (e.g., text, graphics, video, audio, mixed media, etc.), geo-location information, demographic information related to the content, keyword, web property, and the like.

In various implementations, concepts for a given user's labeled content can be automatically derived by system 308 and used to match the user with ad categories or verticals so that ads can be targeted to the user. For example, all of user's labeled content, or the content for a specific label, can be treated as a single document from which concepts can be extracted by concept extraction engines. Examples of a concept extraction engines are described in U.S. Pat. No. 7,231,393, filed Feb. 26, 2004, entitled "Method and Apparatus for Learning a Probabilistic Generative Model for Text," and U.S. Pat. No. 7,383,258, filed Sep. 30, 2003, entitled "Method and Apparatus for Characterizing Documents Based on Clusters of Related Words." Other concept extraction engines or techniques are possible, however.

In some implementations, the content server (or a browser rendering content provided by the content server) can combine the requested content with one or more of the ads or ad link units provided by the system 308. The combination can happen prior to delivery of the content to the user or contemporaneously where the advertising server can serve the ads or ad link units directly to an end user. The combined content and ads or ad link units can be delivered to the user 302 that requested the content for presentation in a viewer (e.g., a browser or other content display system). The content server can transmit information about the ads or ad link units back to the ad server, including information describing how, when, and/or where the ads or ad link units are to be rendered (e.g., in HTML or JavaScript™). The content page 320 can be rendered in the user's viewer with one or more ads 322. When the user 302 clicks on a displayed ad 322 of an advertiser, the user 302 can be redirected to a landing page 318 of the advertiser's web site.

In one implementation, for the system 308 to provide advertisements to the publisher 306 that are targeted to the user 308 upon whose browser the advertisements will be displayed, it is advantageous for user profile information about the user 302 to be provided to the system 308. In some implementations, user profile information and other types of data can be collected by the system 308 and stored in a repository 116. The stored data may include, for example, geographic locations of users, ad context information, etc. The system can then select the advertisements to provide for viewing by the user 302 based at least in part on the user profile information.

Figure 4:
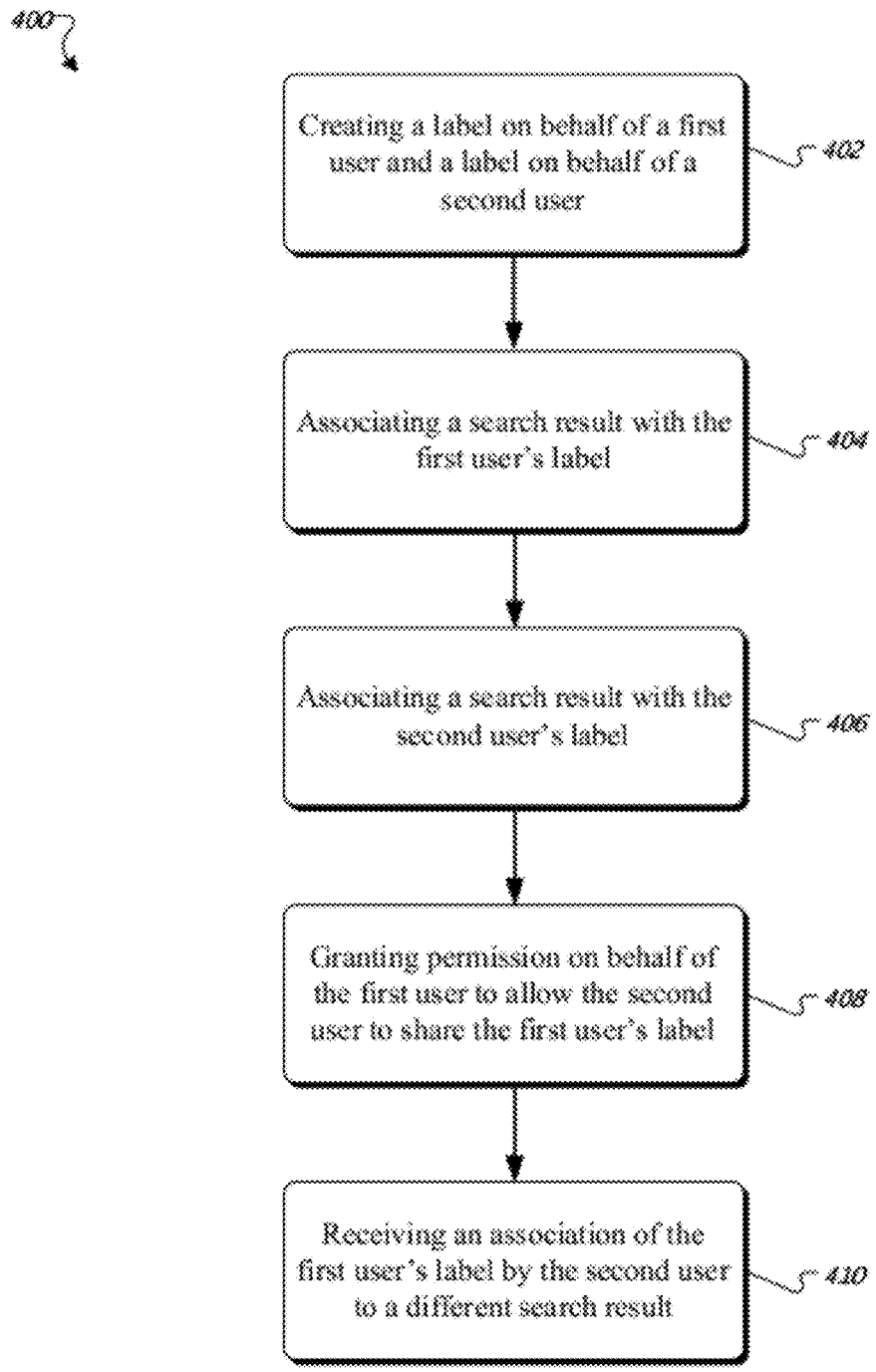
FIG. 4 is a flow diagram of an example technique for sharing labels.

FIG. 4 is a flow diagram of an example technique 400 for sharing labels. In step 402, labels are created (e.g., by the label server 108 or the search engine 106) on behalf of a first user (e.g., User 1 of client device 100) and a second user (e.g., User 2 of client device 104). An association is received (e.g., by the label server 108 or the search engine 106) of the first user's label to a search result (step 404). The second user is unable to view the first user's association because the first user has not shared the label with the second user. In some implementations, the label server 108 creates the association in a label repository 142 in response to receiving the association. Another association is received (e.g., by the label server 108 or the search engine 106) of the second user's label to a search result (step 406). Here, the first user is unable to view the association because the second user has not shared the label with the first user. Again, in some implementations, the label server 108 creates the association in a label repository 142 in response to receiving the association. In step 408, the first user invites the second user to share the first user's label and permission is granted (e.g., by the label server 108). Now second user is able to label content with the first user's label. Subsequent to granting permission, an association of the first user's label by the second user to a search result is received (e.g., by the label server 108 or the search engine 106; step 410).

Figure 5:
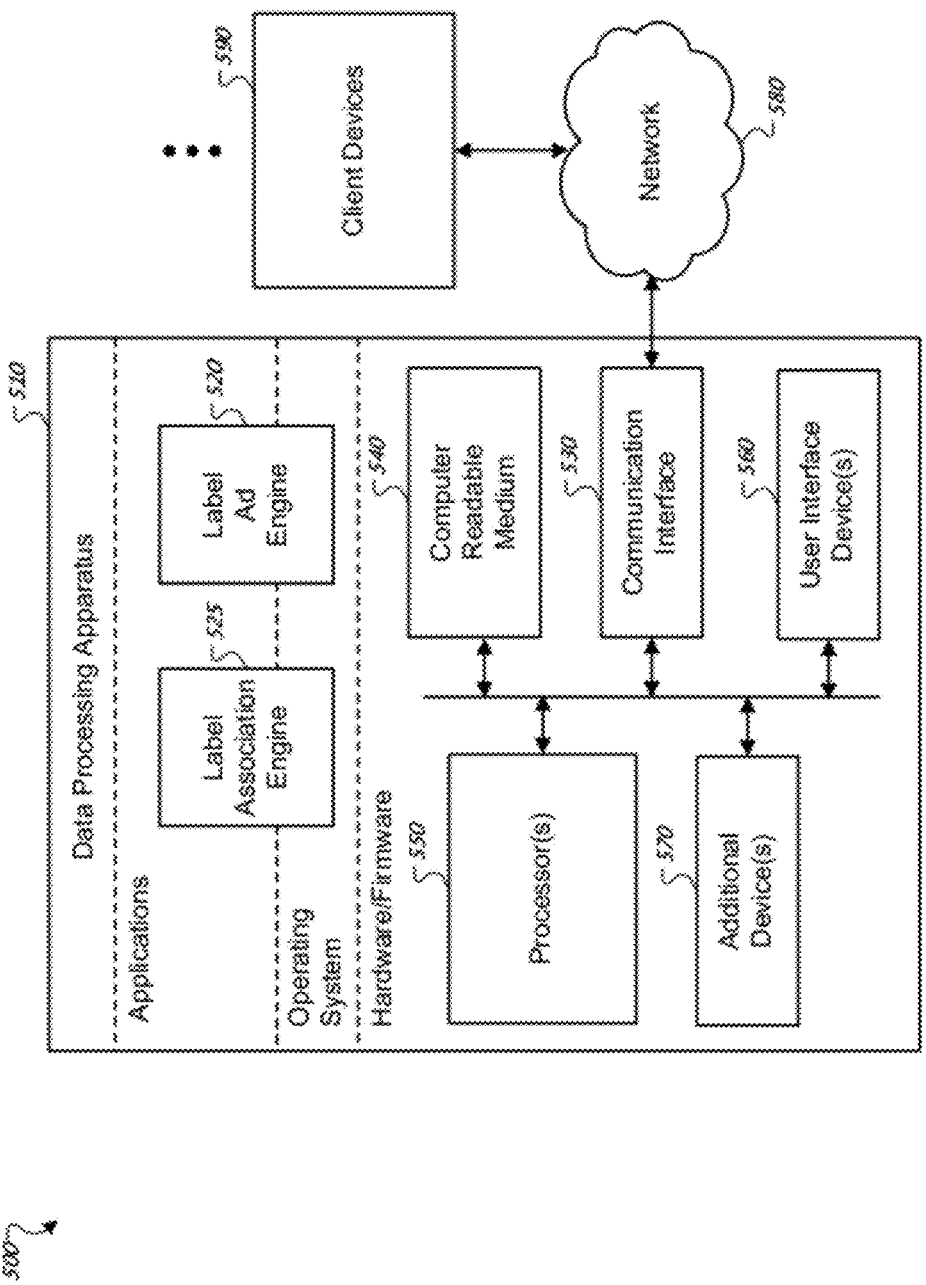
FIG. 5 is a schematic diagram of an example label sharing system.

FIG. 5 is a schematic diagram of an example label sharing system 500. The system 500 generally consists of a server 510 and client devices 590 used to submit label creation requests, label associations, and label sharing requests to the server 510. The computers are connected through a network 580, e.g., the Internet. While the server 510 and client devices 590 are shown as separate devices, in some implementations they are the same device.

The client devices 590 are connected to the server 510 through the network 580. The user device 590 is one or more data processing apparatus. Users interact with the client devices 590 through application software such as web browsers or other applications.

The server 510 is a data processing apparatus and has hardware or firmware devices including one or more processors 550, one or more additional devices 570, a computer readable medium 540, and one or more user interface devices 560. User interface devices 560 can include, for example, a display, a camera, a speaker, a microphone, a tactile feedback device, a keyboard, and a mouse. The server 510 uses its communication interface 530 to communicate with client devices 590 through the network 580. For example, the server 510 can receive requests to create labels, associate labels with content, and share labels, for instance, through its communication interface 530, and can provide user interfaces (e.g., 250, 260) to client devices 590 through its communication interface 560.

In various implementations, the server 510 includes various modules, e.g. executable software programs. In various implementations, these modules include a label association engine 525 and a label ad engine 520. The label association engine 525 maintains and updates label associations 143 and handles requests to share labels with other users. The label ad engine 520 processes label associations in order to determine concepts or ad categories for different users. This information can be used to target ads to the users.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    creating a first label on behalf of a first user and a second label on behalf of a second user;
    receiving an association by the first user of the first label to a first search result in a plurality of first search results that were provided to the first user in response to a query submitted by the first user, and wherein the second user is unable to view the association;
    receiving an association by the second user of the second label to a second search result in a plurality of second search results that were provided to the second user in response to a query submitted by the second user, and wherein the first user is unable to view the association;
    granting permission on behalf of the first user to allow the second user to share the first label; and
    subsequent to granting permission, receiving an association of the first label by the second user to a third search result in a plurality of third search results that were provided to the second user in response to a query submitted by the second user.

2. The method of claim 1 wherein a search result is a web page, an image, a video, a news article or an advertisement.

3. The method of claim 1 wherein the first label and the second label are identical.

4. The method of claim 1, further comprising deriving one or more concepts by analyzing content of search results associated with the first label.

5. The method of claim 4, further comprising associating one or more ad categories with the first user based on the derived concepts.

6. The method of claim 4, further comprising targeting advertising to the first user based on the derived concepts.

7. The method of claim 1, further comprising publishing one or more search results associated with the first label.

8. The method of claim 1 wherein receiving an association by the first user of the first label to the first search result includes storing a portion of the first search result as part of the association.

9. A computer program product, encoded on a computer-readable storage device, operable to cause data processing apparatus to perform operations comprising:
    creating a first label on behalf of a first user and a second label on behalf of a second user;
    creating a first label on behalf of a first user and a second label on behalf of a second user;
    receiving an association by the first user of the first label to a first search result in a plurality of first search results that were provided to the first user in response to a query submitted by the first user, and wherein the second user is unable to view the association;
    receiving an association by the second user of the second label to a second search result in a plurality of second search results that were provided to the second user in response to a query submitted by the second user, and wherein the first user is unable to view the association;

granting permission on behalf of the first user to allow the second user to share the first label; and subsequent to granting permission, receiving an association of the first label by the second user to a third search result in a plurality of third search results that were provided to the second user in response to a query submitted by the second user.

10. The program product of claim 9 wherein a search result is a web page, an image, a video, a news article or an advertisement.

11. The program product of claim 9 wherein the first label and the second label are identical.

12. The program product of claim 9 wherein the operations further comprise deriving one or more concepts by analyzing content of search results associated with the first label.

13. The program product of claim 12 wherein the operations further comprise associating one or more ad categories with the first user based on the derived concepts.

14. The program product of claim 12 wherein the operations further comprise targeting advertising to the first user based on the derived concepts.

15. The program product of claim 9 wherein the operations further comprise publishing one or more search results associated with the first label.

16. The program product of claim 9 wherein receiving an association by the first user of the first label to the first search result includes storing a portion of the first search result as part of the association.

17. A system comprising:

a computer readable medium having instructions stored thereon; and one or more processors configured to execute the instructions and perform operations comprising:

creating a first label on behalf of a first user and a second label on behalf of a second user;

receiving an association by the first user of the first label to a first search result in a plurality of first search results that were provided to the first user in response to a query submitted by the first user, and wherein the second user is unable to view the association;

receiving an association by the second user of the second label to a second search result in a plurality of second search results that were provided to the second user in response to a query submitted by the second user, and wherein the first user is unable to view the association;

granting permission on behalf of the first user to allow the second user to share the first label; and subsequent to granting permission, receiving an association of the first label by the second user to a third search result in a plurality of third search results that were provided to the second user in response to a query submitted by the second user.

18. The system of claim 17 wherein a search result is a web page, an image, a video, a news article or an advertisement.

19. The system of claim 17 wherein the first label and the second label are identical.

20. The system of claim 17 wherein the operations further comprise deriving one or more concepts by analyzing content of search results associated with the first label.

21. The system of claim 20 wherein the operations further comprise associating ad categories with the first user based on the derived concepts.

22. The system of claim 20 wherein the operations further comprise targeting advertising to the first user based on the derived concepts.

23. The system of claim 17 wherein the operations further comprise publishing one or more search results associated with the first label.

24. The system of claim 17 wherein receiving an association by the first user of the first label to the first search result includes storing a portion of the first search result as part of the association.

* * * * *